United States Patent
Nagaraja

(10) Patent No.: US 8,676,221 B2
(45) Date of Patent: Mar. 18, 2014

(54) MULTIBAND ANTENNA FOR COOPERATIVE MIMO

(75) Inventor: Nagendra Nagaraja, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 12/482,862

(22) Filed: Jun. 11, 2009

(65) Prior Publication Data

US 2010/0316002 A1   Dec. 16, 2010

(51) Int. Cl.
*H04W 40/00* (2009.01)
(52) U.S. Cl.
USPC ............. 455/449; 455/446; 455/447; 455/62; 455/522
(58) Field of Classification Search
USPC ................. 455/73, 90.2, 509, 115, 507, 522, 455/445–449; 375/299, 260; 343/861; 370/338, 229, 248, 252
See application file for complete search history.

(56) References Cited

U.S. PATENT DOCUMENTS

| | | | |
|---|---|---|---|
| 8,125,897 B2* | 2/2012 | Ray et al. | 370/229 |
| 2005/0245199 A1* | 11/2005 | Batra et al. | 455/73 |
| 2006/0120477 A1 | 6/2006 | Shen et al. | |
| 2006/0229090 A1* | 10/2006 | LaDue | 455/507 |
| 2007/0160014 A1* | 7/2007 | Larsson | 370/338 |
| 2007/0222697 A1* | 9/2007 | Caimi et al. | 343/861 |
| 2008/0081655 A1* | 4/2008 | Shin et al. | 455/522 |
| 2008/0130790 A1* | 6/2008 | Forenza et al. | 375/299 |
| 2008/0132262 A1* | 6/2008 | Jung et al. | 455/513 |
| 2008/0244148 A1* | 10/2008 | Nix et al. | 710/313 |
| 2008/0318520 A1 | 12/2008 | Kwun et al. | |
| 2009/0047916 A1* | 2/2009 | Haykin | 455/115.1 |
| 2009/0082053 A1* | 3/2009 | Wei et al. | 455/522 |
| 2009/0116422 A1* | 5/2009 | Chong et al. | 370/315 |
| 2009/0186645 A1* | 7/2009 | Jaturong et al. | 455/507 |
| 2009/0197624 A1* | 8/2009 | Kwak et al. | 455/517 |
| 2009/0207928 A1* | 8/2009 | Li et al. | 375/260 |
| 2009/0291690 A1* | 11/2009 | Guvenc et al. | 455/444 |
| 2010/0136928 A1* | 6/2010 | Rofougaran | 455/90.2 |
| 2010/0234045 A1* | 9/2010 | Karr et al. | 455/456.1 |

FOREIGN PATENT DOCUMENTS

| | | |
|---|---|---|
| CN | 101414860 A | 4/2009 |
| JP | 2007500482 A | 1/2007 |
| JP | 2008219134 A | 9/2008 |

OTHER PUBLICATIONS

Kyasanur, Pradeep, "On the efficacy of separating control and data into different frequency bands", Jul. 28, 2005, Dept. of Computer Science, University of Illinois at Urbana-Champaign and Microsoft Research.*
Hedayat A, et al., "Cooperative communication in wireless networks", IEEE Communications Magazine, IEEE Service Center, Piscataway, US, vol. 42, No. 10, Oct. 1, 2004, pp. 74-80, XP011120045.
International Preliminary Report on Patentability—PCT/US2010/038235, The International Bureau of WIPO—Geneva, Switzerland, Jul. 20, 2011.
International Search Report and Written Opinion—PCT/US2010/038235, International Search Authority—European Patent Office—Feb. 22, 2011.

(Continued)

*Primary Examiner* — Kent Chang
*Assistant Examiner* — William Lu
(74) *Attorney, Agent, or Firm* — Eric Ho

(57) ABSTRACT

Certain aspects provide a method for reducing interference in a cooperative MIMO system.

58 Claims, 8 Drawing Sheets

(56) References Cited

OTHER PUBLICATIONS

Laneman J N, et al., "Cooperative Diversity in Wireless Networks: Efficient Protocols and Outage Behaviour" IEEE Transactions on Information Theory, IEEE, US LNKDDOI: 10.1109/TIT.2004.838089, vol. 50, No. 12, Dec. 1, 2004, pp. 3062-3080, X.

Qiu Lin, et al., "Cross-Layer Design for Relay Selection and Power Allocation Strategies in Cooperative Networks", Communication Networks and Services Research Conference, 2009. CNSR '09. Seventh Annual, IEEE, Piscataway, NJ, USA, May 11, 2009, pp. 232-237, XP031456667.

Taiwan Search Report—TW099118914—TIPO—Mar. 21, 2013.

* cited by examiner

MULTIBAND ANTENNA FOR COOPERATIVE MIMO

TECHNICAL FIELD

Certain aspects of the present disclosure generally relate to wireless communication, and more particularly, to techniques to reduce the interference in a cooperative multiple-input multiple-output (MIMO) using multiband antennas.

BACKGROUND

Cooperative multiple-input multiple-output (MIMO) is a promising technique for future generations of wireless communications systems, especially for systems utilizing broadcast or peer to peer (P2P) networks. One of the main disadvantages of a cooperative MIMO system compared to a traditional MIMO system is the extra interference as a result of cooperation between nodes.

Therefore, there is a need in the art for techniques to reduce the interference in a cooperative MIMO system.

SUMMARY

Certain aspects of the present disclosure provide a method for wireless communications by a mobile station in a cooperative multiple input multiple output (MIMO) system. The method generally includes receiving information from a base station about a first frequency band to be used for direct transmission and a second frequency band to be used for cooperation and monitoring a plurality of signals received over the second frequency band and measuring the power of the received signals and transmitting information to the base station about power values of the signals received over the second frequency band and receiving a maximum allowable power value for the second frequency band from the base station and transmitting data on both the first and the second frequency bands, wherein the transmission power in the second frequency band is less than the maximum allowable power value for the second frequency band.

Certain aspects of the present disclosure provide a method for wireless communications by a base station in a cooperative multiple input multiple output (MIMO) system. The method generally includes selecting at least a first frequency band to be used for direct transmission and selecting at least a second frequency band to be used for cooperation between mobile stations in a cooperative MIMO communication system and transmitting information about the first and the second frequency bands to at least one mobile station and receiving information from the mobile station about power values received in the second frequency band from other mobile stations in the vicinity of the mobile station and assigning a maximum power value to the mobile station to be used in the second frequency band in order to reduce the interference of the communication system and transmitting the maximum power values for the second frequency band to the mobile station.

Certain aspects of the present disclosure provide an apparatus for wireless communications by a mobile station in a cooperative multiple input multiple output (MIMO) system. The apparatus generally includes logic for receiving information from a base station about a first frequency band to be used for direct transmission and a second frequency band to be used for cooperation and logic for monitoring a plurality of signals received over the second frequency band and measuring the power of the received signals logic for transmitting information to the base station about power values of the signals received over the second frequency band and logic for receiving a maximum allowable power value for the second frequency band from the base station and logic for transmitting data on both the first and the second frequency bands, wherein the transmission power in the second frequency band is less than the maximum allowable power value for the second frequency band.

Certain aspects of the present disclosure provide an apparatus for wireless communications by a base station in a cooperative multiple input multiple output (MIMO) system. The apparatus generally includes logic for selecting at least a first frequency band to be used for direct transmission and selecting at least a second frequency band to be used for cooperation between mobile stations in a cooperative MIMO communication system and logic for transmitting information about the first and the second frequency bands to at least one mobile station and logic for receiving information from the mobile station about power values received in the second frequency band from other mobile stations in the vicinity of the mobile station and logic for assigning a maximum power value to the mobile station to be used in the second frequency band in order to reduce the interference of the communication system and logic for transmitting the maximum power values for the second frequency band to the mobile station.

Certain aspects of the present disclosure provide an apparatus for wireless communications by a mobile station in a cooperative multiple input multiple output (MIMO) system. The apparatus generally includes means for receiving information from a base station about a first frequency band to be used for direct transmission and a second frequency band to be used for cooperation and means for monitoring a plurality of signals received over the second frequency band and measuring the power of the received signals and means for transmitting information to the base station about power values of the signals received over the second frequency band and means for receiving a maximum allowable power value for the second frequency band from the base station and means for transmitting data on both the first and the second frequency bands, wherein the transmission power in the second frequency band is less than the maximum allowable power value for the second frequency band.

Certain aspects of the present disclosure provide an apparatus for wireless communications by a base station in a cooperative multiple input multiple output (MIMO) system. The apparatus generally includes means for selecting at least a first frequency band to be used for direct transmission and selecting at least a second frequency band to be used for cooperation between mobile stations in a cooperative MIMO communication system and means for transmitting information about the first and the second frequency bands to at least one mobile station and means for receiving information from the mobile station about power values received in the second frequency band from other mobile stations in the vicinity of the mobile station and means for assigning a maximum power value to the mobile station to be used in the second frequency band in order to reduce the interference of the communication system and means for transmitting the maximum power values for the second frequency band to the mobile station.

Certain aspects of the present disclosure provide a computer-program product for wireless communications by a mobile station in a cooperative multiple input multiple output (MIMO) system, comprising a computer readable medium having instructions stored thereon, the instructions being executable by one or more processors. The instructions generally include instructions for receiving information from a base station about a first frequency band to be used for direct transmission and a second frequency band to be used for cooperation and instructions for monitoring a plurality of signals received over the second frequency band and measuring the power of the received signals and instructions for transmitting information to the base station about power values of the signals received over the second frequency band and instructions for receiving a maximum allowable power value for the second frequency band from the base station and instructions for transmitting data on both the first and the second frequency bands, wherein the transmission power in the second frequency band is less than the maximum allowable power value for the second frequency band.

Certain aspects of the present disclosure provide a computer-program product for wireless communications by a base station in a cooperative multiple input multiple output (MIMO) system, comprising a computer readable medium having instructions stored thereon, the instructions being executable by one or more processors. The instructions generally include instructions for selecting at least a first frequency band to be used for direct transmission and selecting at least a second frequency band to be used for cooperation between mobile stations in a cooperative MIMO communication system and instructions for transmitting information about the first and the second frequency bands to at least one mobile station and instructions for receiving information from the mobile station about power values received in the second frequency band from other mobile stations in the vicinity of the mobile station and instructions for assigning a maximum power value to the mobile station to be used in the second frequency band in order to reduce the interference of the communication system and instructions for transmitting the maximum power values for the second frequency band to the mobile station.

BRIEF DESCRIPTION OF THE DRAWINGS

So that the manner in which the above recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of certain aspects of the present disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects. Also as used herein, the term "legacy stations" generally refers to wireless network nodes that support 802.11n or earlier versions of the IEEE 802.11 standard.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

An Example Mimo System

Figure 1:
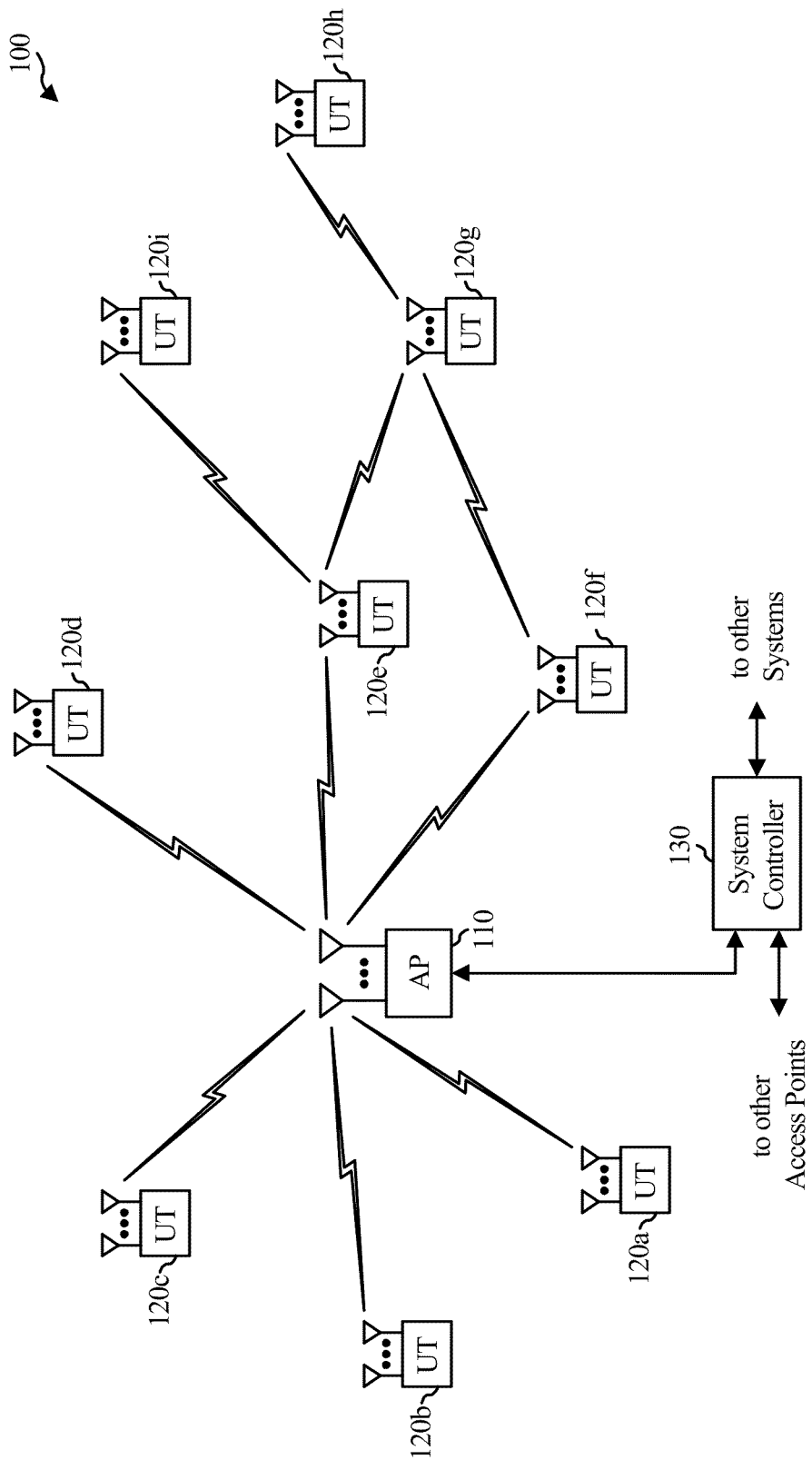
FIG. 1 illustrates a spatial division multiple access MIMO wireless system in accordance with certain aspects of the present disclosure.

FIG. 1 illustrates a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$, of selected user terminals 120 collectively represents the multiple-output for downlink transmissions and the multiple-input for uplink transmissions. In certain cases, it may be desirable to have $N_{ap} \geq N_u \geq 1$ if the data symbol streams for the $N_u$ user terminals are not multiplexed in code, frequency, or time by some means. $N_u$ may be greater than $N_{ap}$ if the data symbol streams can be multiplexed using different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
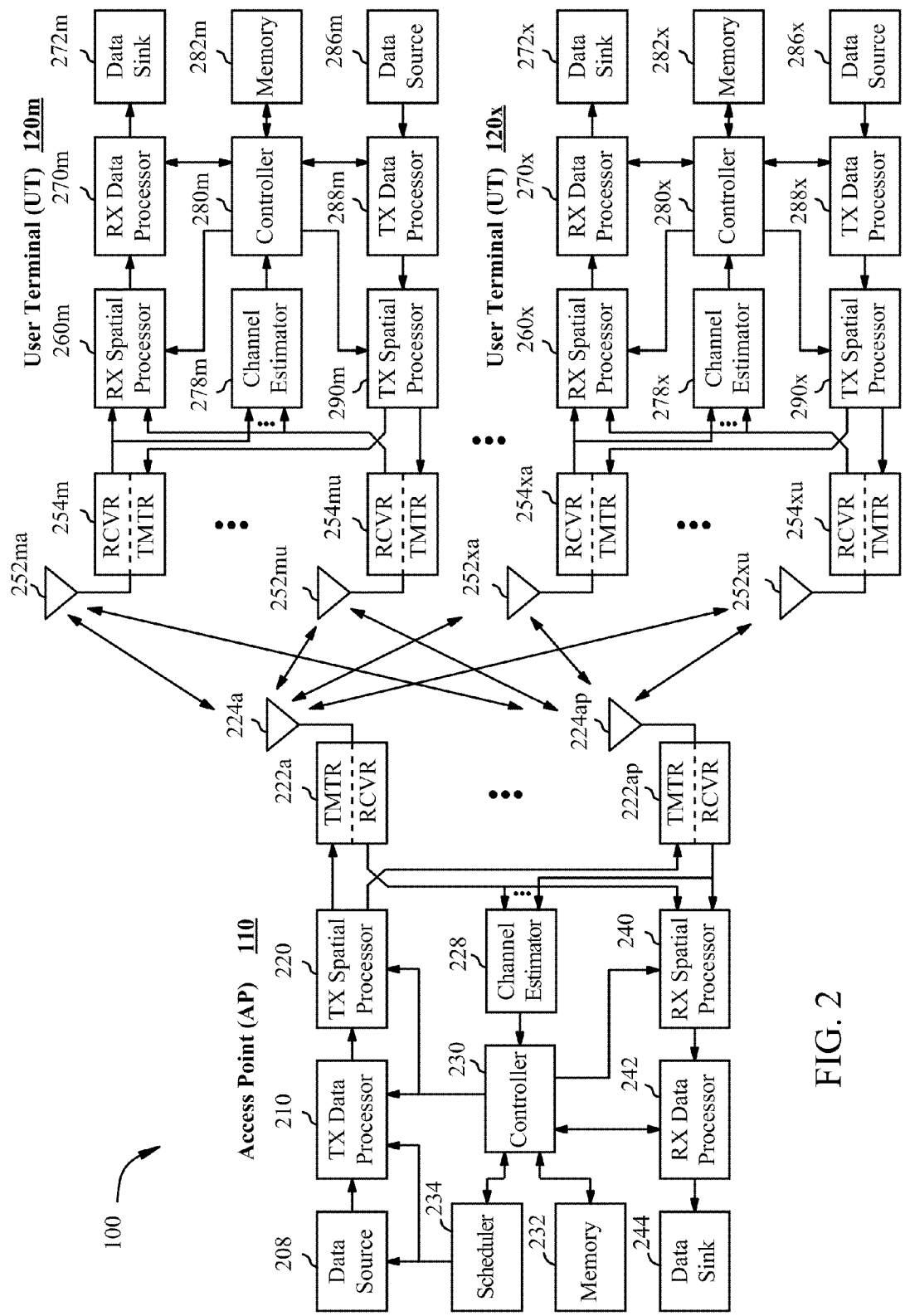
FIG. 2 illustrates a block diagram of an access point and two user terminals in accordance with certain aspects of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{s_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{s_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{S_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{S_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Figure 3:
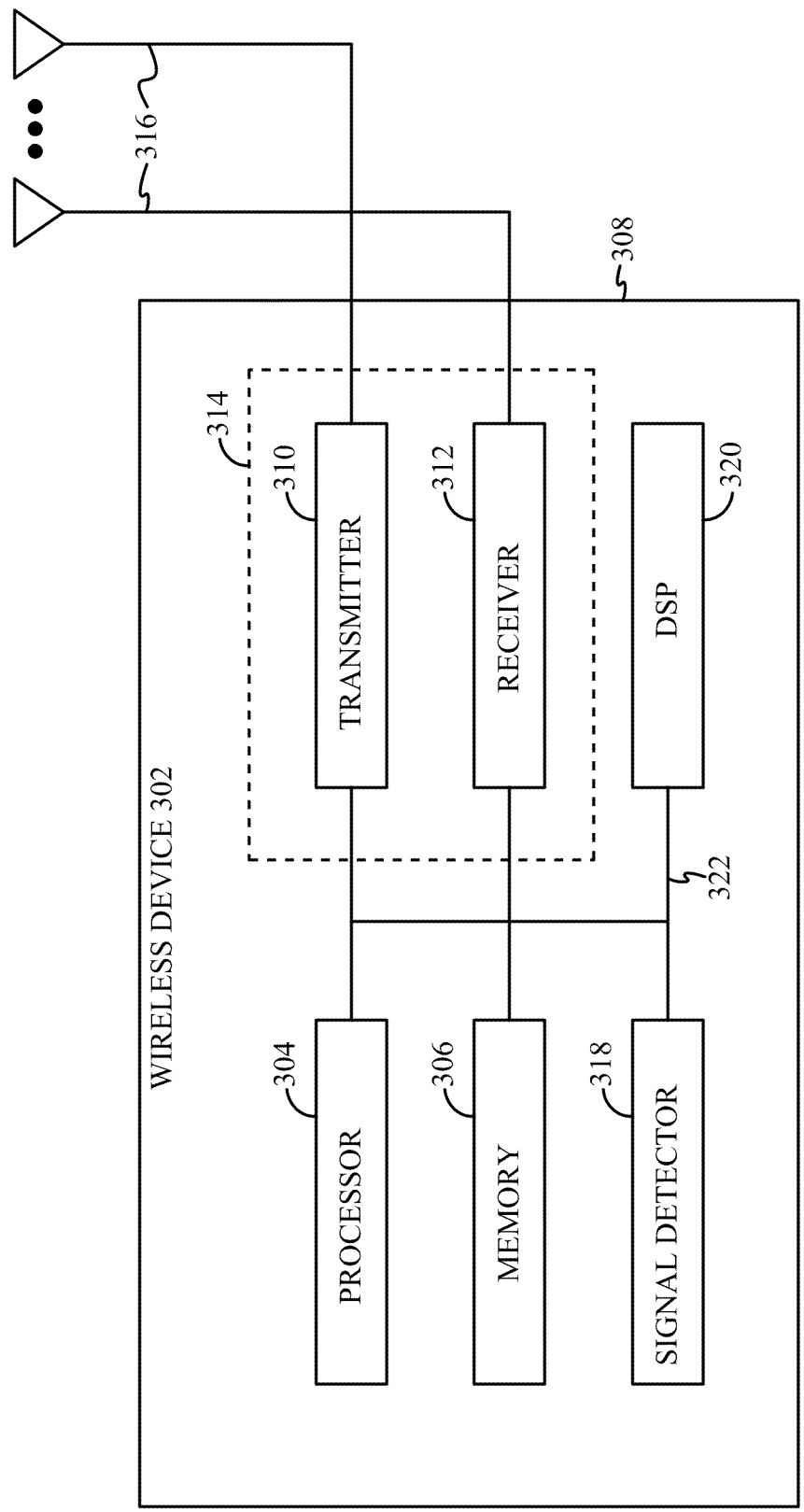
FIG. 3 illustrates example components of a wireless device in accordance with certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Those skilled in the art will recognize the techniques described herein may be generally applied in systems utilizing any type of multiple access schemes, such as SDMA, OFDMA, CDMA, SDMA, and combinations thereof.

Multiband Antenna for Cooperative Mimo

In a cooperative MIMO system, a plurality of single-antenna devices may form a group and share their antennas for transmission and reception of data, while in a conventional MIMO system, a single device may employ multiple antennas that are physically located on the device. Therefore, in a system utilizing cooperative MIMO, single antenna devices form a virtual MIMO system to enjoy the benefits of MIMO, such as diversity and spatial multiplexing.

Cooperative MIMO may be used by devices with small footprints, when increasing the number of antennas on the device is not feasible. The antennas on a device may need to be separated by a certain distance in order to operate over independent channels. As a result, it may not be possible to add more antennas to a device with a small footprint without increasing the size of the device.

In a three-node cooperative MIMO system including a base station and two mobile stations, two classes of information may exist, such as the information transmitted over the direct path from each mobile station (MS) to the base station and the information transmitted between mobile stations for cooperation. Transmission of extra information between mobile stations for cooperation may add interference to the system. Most of the wireless systems can tolerate limited amount of interference, therefore, interference of a system due to cooperation should be minimized. Effects of cooperation in cooperative MIMO technique on the interference of a system are usually ignored in the literature.

For example, in a three-node cooperative communication system, including two mobile stations and a base station, in which each MS may act as a relay for the other MS, the mobile stations may use time-multiplexing techniques to transmit their information to the other mobile station and the base station. As a result, each MS may utilize two separate time slots to transmit the direct path data packets and cooperation data packets. Therefore, a first MS may transmit a data packet to the base station in a first time slot and a second MS may transmit another data packet to the base station in a second time slot. Both of the mobile stations may transmit their cooperative data packets in a third time slot simultaneously. The cooperative data packets exchanged between mobile stations should use less bandwidth than the direct path data packets.

In the time-multiplexed scheme, interference of each MS on the other MS during the third time slot is usually ignored and the system is assumed to be point to point. However, in practice, a time-multiplexed MIMO system should be able to tolerate the co-channel interference in the third time slot, in which both MSs transmit simultaneously, otherwise, performance of the system may degrade due to interference.

The above time-multiplexed system has a few known drawbacks. All the nodes (i.e., mobile stations and the base station) should be time-synchronized. The time-multiplexed system may require expensive time-domain computations. It may also not be possible to scale the above time-multiplexed scheme to n mobile stations. For example, if a system consists of n mobile stations, the cooperative data packets may reach the base station after n time slots, which may be too late for time-sensitive applications.

For certain aspects of the present disclosure, a frequency-based interference mitigation technique may be utilized to reduce the interference of cooperation in a cooperative MIMO system. In the frequency-based interference mitigation technique, a frequency band may be allocated for cooperation in addition to the frequency band that is used for direct transmission. The frequency band which is allocated for cooperation may be called 'relay band' or 'cooperation band.' It may also be possible to allocate a group of frequency bands for cooperation between mobile stations and a group of frequency bands for direct transmission to the base station.

For certain aspects of the present disclosure, power and range of the transmission may be limited in the cooperation frequency band. Only a small fraction of the total power of an MS may be allocated to the cooperation band and most of the power may be allocated to the frequency band used for direct transmission. Therefore, transmission over the cooperation band may be restricted to only a few mobile stations that are physically close to each other.

For certain aspects of the present disclosure, an MS may simultaneously transmit data in both cooperation band and direct link band using a single dual-band antenna. A dual-band antenna may support a first frequency band for direct path transmission and a second frequency band for cooperation. Therefore, a single dual band antenna may support cooperative MIMO transmissions in two different frequency bands. By using two or more frequency bands for transmitting the direct path data packets and the cooperation data packets, overall interference of the system may be reduced. The cooperation frequency band may utilize a multiple access or a random access channel.

For certain aspects of the present disclosure, a plurality of mobile stations may cooperate to transmit their data to a base station. The mobile stations may use a single frequency band or a plurality of frequency bands to transmit cooperative data to each other. The mobile stations may utilize a single or a plurality of frequency bands for direct transmission of their own data to the destination. The cooperation frequency bands may be employed either to increase the diversity of the system or to add spatial multiplexing to the system.

Figure 4:
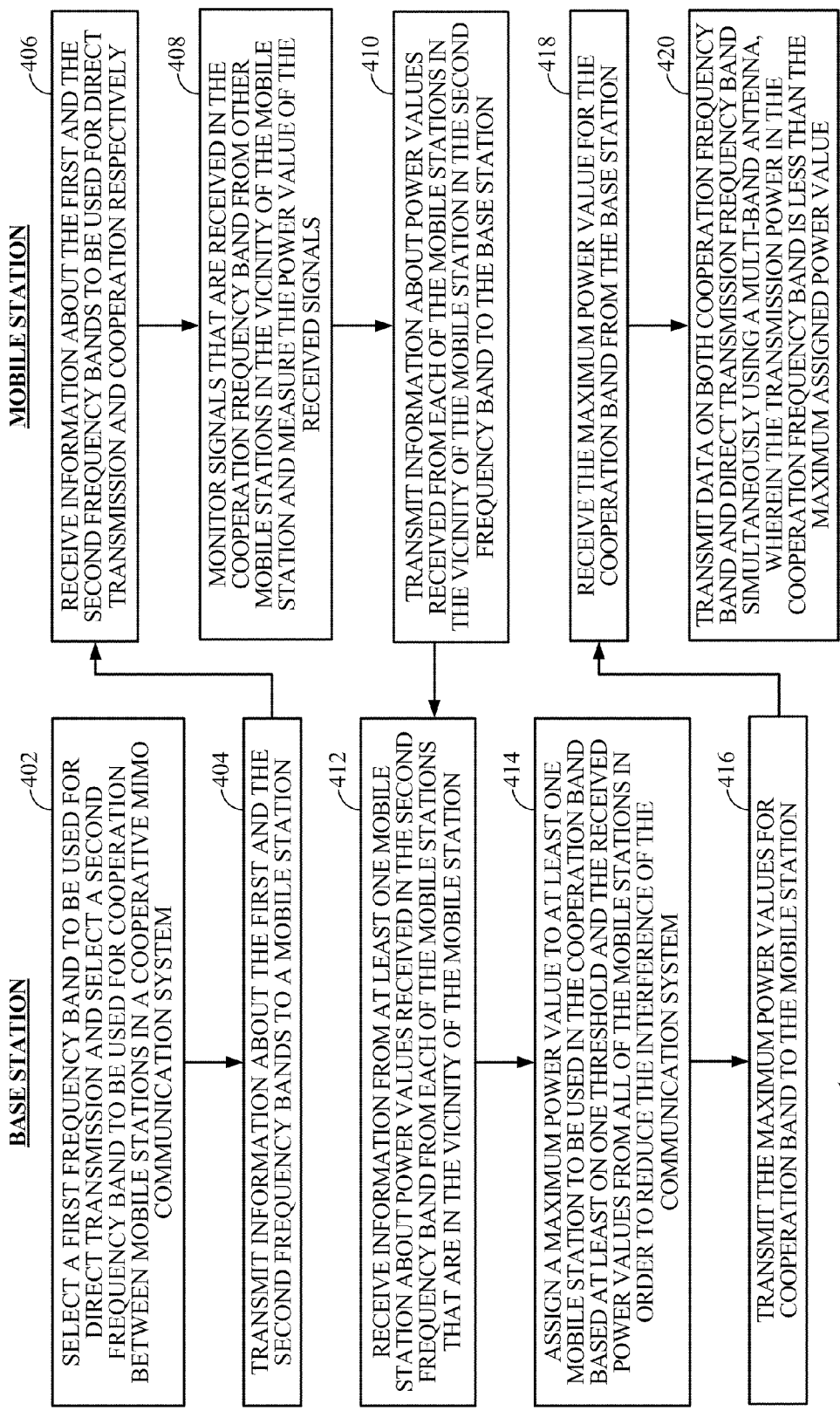
FIG. 4 illustrates example operations for reducing interference in a cooperative MIMO system, in accordance with certain aspects of the present disclosure.

FIG. 4 illustrates example operations for reducing interference in a cooperative MIMO system, in accordance with certain aspects of the present disclosure. At 402, a base station selects at least one frequency band (i.e., first frequency band) to be used for direct transmission and selects at least one frequency band (i.e., second frequency band) to be used for cooperation between mobile stations in a cooperative MIMO communication system. At 404, the base station transmits information about the first and the second frequency bands to at least one mobile station.

At 406, a mobile station receives information from a base station about the first frequency band to be used for direct transmission and the second frequency band to be used for cooperation. At 408, the mobile station monitors signals received over the second frequency band from mobile stations in its vicinity and measures the power of the received signals. At 410 the mobile station transmits information to the base station about power values received over the second frequency band from each of the mobile stations in its vicinity.

At 412, the base station receives information from at least one mobile station about power values received in the second frequency band from other mobile stations in the vicinity of the mobile station. At 414, the base station assigns a maximum power value to each mobile station to be used in the cooperation frequency band in order to reduce the interference of the communication system. The base station calculates the maximum power value based at least on one threshold and the received power values from all of the mobile stations in the vicinity of the mobile station using a power control scheme. The base station may have separate power control schemes for the cooperation band and the direct transmission band. The maximum allowable power for the cooperation band is much smaller than a maximum allowable power value for transmission in the direct transmission frequency band. At 416, the base station transmits maximum power values for cooperation frequency band to the mobile station.

At 418, the mobile station receives a maximum allowable power value for the cooperation band from the base station. At 420, the mobile station transmits data on both cooperation frequency band and direct transmission frequency band simultaneously using a multi-band antenna.

Figure 5:
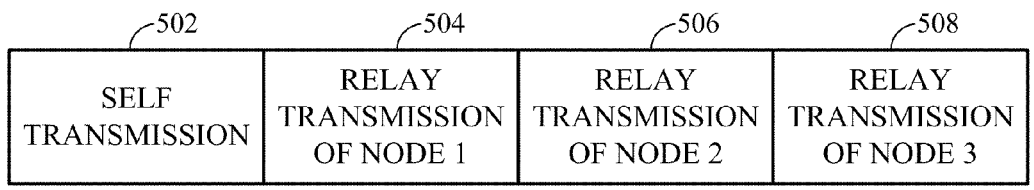
FIG. 5 illustrates an example scalable frame structure for uplink transmission in a cooperative MIMO system, in accordance with certain aspects of the present disclosure.

FIG. 5 illustrates an example scalable frame structure 500 for uplink transmission in a cooperative MIMO system, in accordance with certain aspects of the present disclosure. Each cooperating mobile station may concatenate its own data packet 502 with the cooperation data packet received from other mobile stations in its vicinity 504-508 to generate a scalable frame structure 500 for uplink transmission. The mobile station may transmit the frame 500 to the base station over the direct transmission frequency band.

For certain aspects of the present disclosure, the power used for transmission in the cooperation frequency band may be controlled by a base station. The transmission power may be limited so that only a few mobile stations in the vicinity of a mobile station receive the cooperative information transmitted by the mobile station. As a result, the interference of the system may be reduced and signal to interference ratio (SIR) of the system may be increased.

For certain aspects of the present disclosure, a base station may have knowledge about all the mobile stations that are willing and able to cooperate. The base station may determine the cooperating groups of mobile stations based on the information received from each of the mobile stations.

Figure 6:
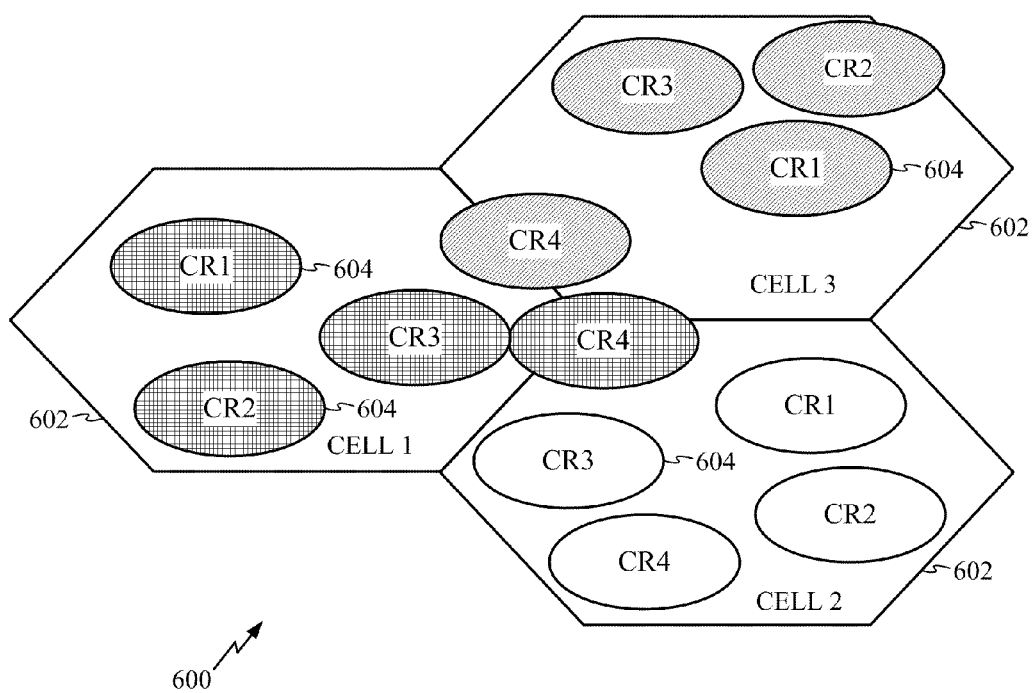
FIG. 6 illustrates example cooperation regions within cells of a cellular network, in accordance with certain aspects of the present disclosure.

FIG. 6 illustrates example cooperation regions 604 within cells 602 of a cellular network 600, in accordance with certain aspects of the present disclosure. As illustrated, cooperation may be localized among a few mobile stations that are physically close to each other. Therefore, the frequency band that is allocated to cooperation may be reused across a cell site and between cells. The maximum allowable power for transmission in the cooperation frequency band by each mobile station may be determined by the base station such that only mobile stations in a cooperation region 604 receive the information sent by other mobile stations in the same cooperation region.

For certain embodiments of the present disclosure, a base station may determine cooperation regions and maximum allowable power value for transmission in the cooperation band based on the information received from all of the mobile stations. The base station receives information from each mobile station about power level of the signals received in the cooperation frequency band from other mobile stations in the vicinity of the mobile station. The base station may use a plurality of predetermined threshold values to determine the maximum allowable transmission power from each mobile station in the cooperation frequency band to restrict cooperation to certain regions. The base station may notify mobile stations about the maximum allowable power for transmission in the cooperation frequency band.

Figure 7:
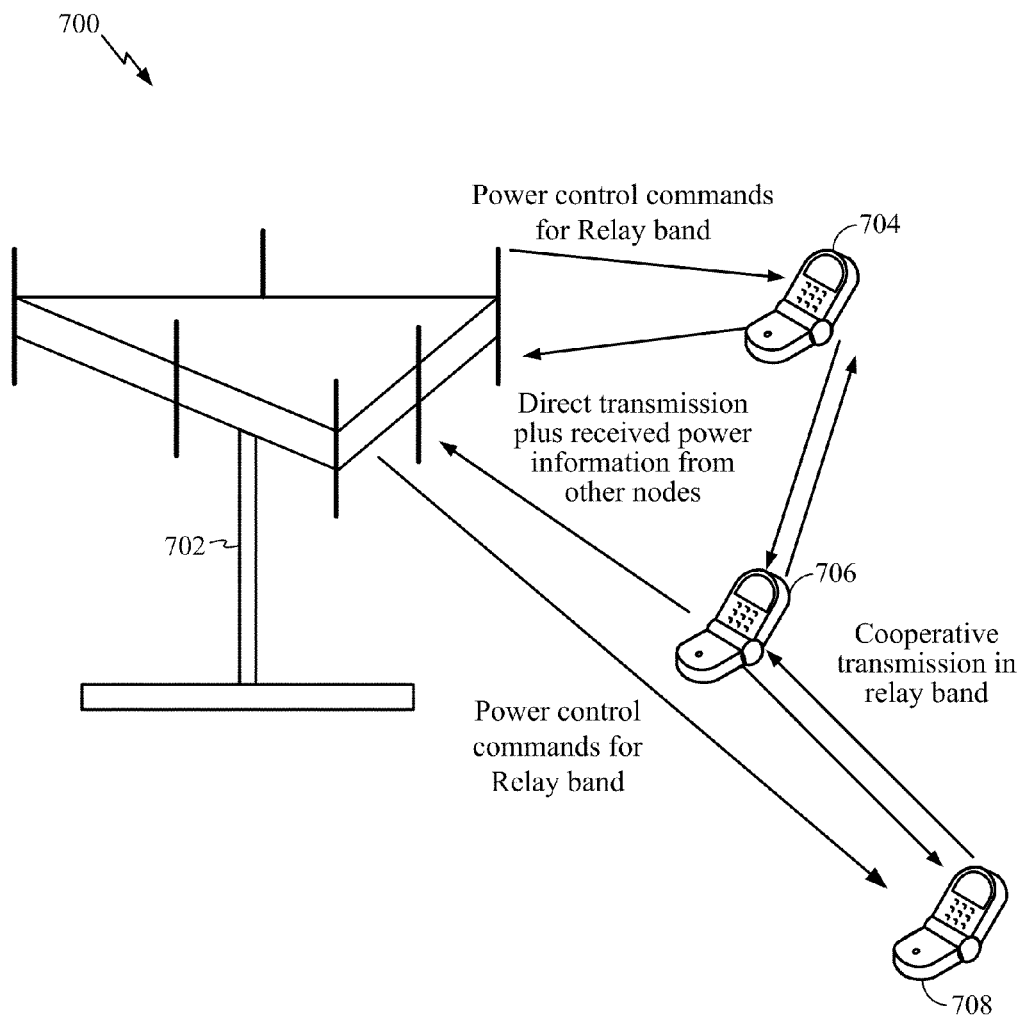
FIG. 7 illustrates example communications between a base station and mobile stations in a cooperative MIMO system, in accordance with certain aspects of the present disclosure.

FIG. 7 illustrates example communications between a base station and a plurality of mobile stations in a cooperative MIMO system 700, in accordance with certain aspects of the present disclosure. The base station 702 receives a plurality of uplink transmission signals from mobile stations 702-706 over the frequency bands assigned for direct transmission. The mobile stations transmit information about the power value of the other mobile stations in their vicinity to the base station. The base station transmits power control commands to mobile stations to notify them of the maximum allowable power for transmission in the cooperation band. The mobile stations transmit information to other mobile stations in their vicinity and receive information from other mobile stations over the cooperation band.

In a cooperative MIMO system, if a mobile station transmits cooperation data packets to other mobile stations in its vicinity using high power levels (i.e., power levels similar to the direct path uplink transmission), the mobile station may introduce large amounts of interference to the system. Therefore, for certain aspects of the present disclosure, in order to decrease the amount of interference in a system, cooperation may be localized to certain regions. As a result, the mobile stations may transmit their data packets to the other mobile stations with smaller power levels. Localizing cooperation to certain cooperation regions decreases overall interference and increases the SIR of the system.

For certain aspects of the present disclosure, a base station may control the mobile stations in a cooperative MIMO system. The base station may determine when a mobile station enters or leaves a cooperation group or region. The base station may have visibility of cooperating mobile stations and may maintain a list of cooperating mobile stations per cooperation region.

Figure 4A:
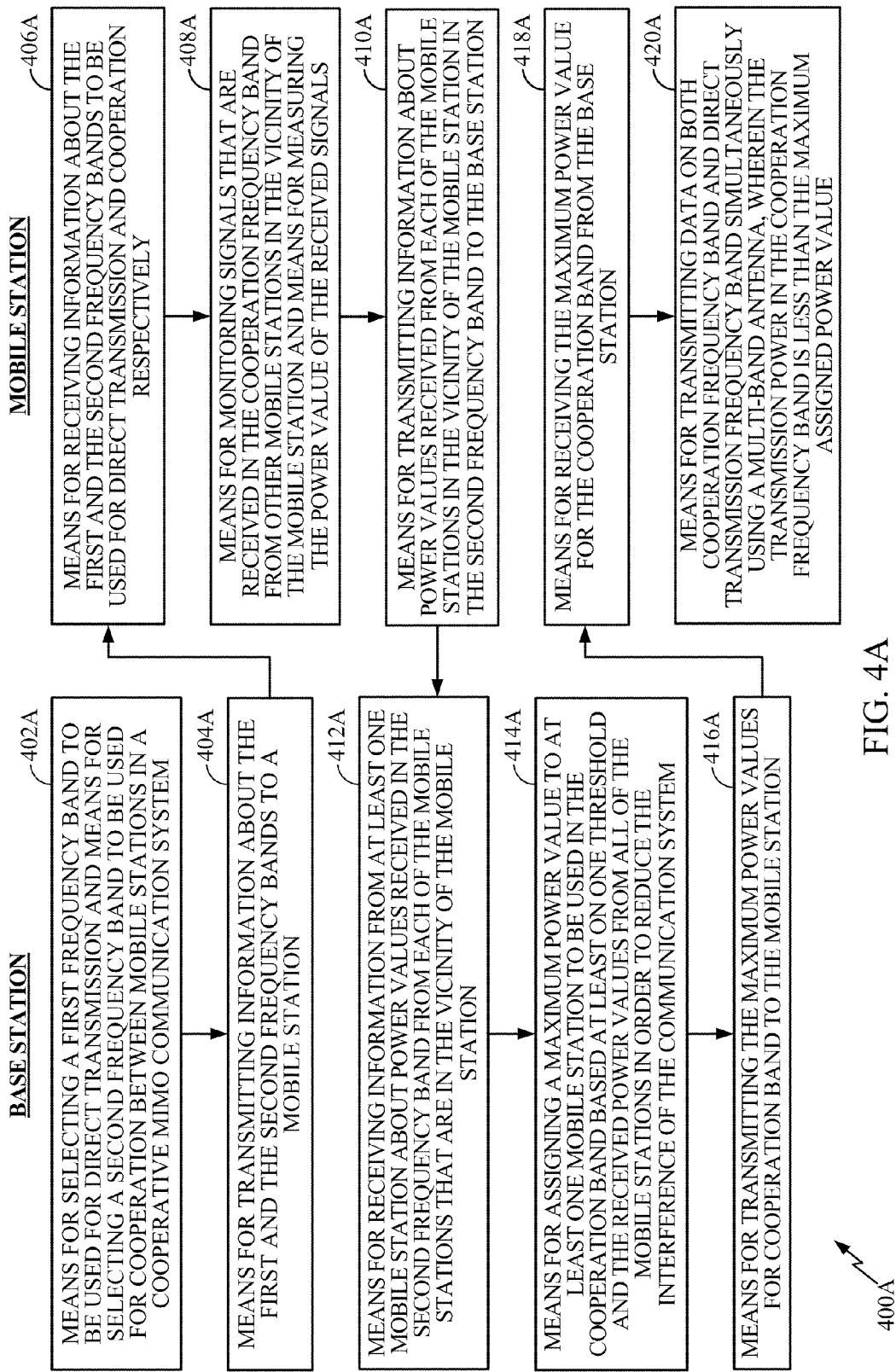
FIG. 4A illustrates example components capable of performing the operations shown in FIG. 4.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 402-420, illustrated in FIG. 4 correspond to circuit blocks 402A-420A, illustrated in FIG. 4A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that may be known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions may be specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software may be transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It may be to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications in a cooperative multiple input multiple output (MIMO) system using multi-band antennas, the method comprising:

receiving, at a first mobile station, information from a base station, the information associated with a first frequency band and a second frequency band, wherein the first frequency band is for transmissions between the first mobile station and the base station, and wherein the second frequency band is for transmissions between the first mobile station and one or more second mobile stations;

monitoring signals received over the second frequency band and measuring power of the signals;

transmitting, to the base station, at least one power value of the signals received over the second frequency band;

receiving, at the first mobile station from the base station, an allowable power value for the second frequency band; and transmitting data over the first frequency band and the second frequency band, wherein transmission power for transmission over the second frequency band is less than the allowable power value for the second frequency band.

2. The method of claim 1, wherein the data is transmitted simultaneously over the first frequency band and the second frequency band using a multi-band antenna.

3. The method of claim 1, wherein the signals received over the second frequency band are transmitted from the one or more second mobile stations in a vicinity of the first mobile station.

4. The method of claim 1, wherein the second frequency band employs a multiple access channel or a random access channel.

5. The method of claim 1, wherein the allowable power value for transmission over the second frequency band is less than a second allowable power value for transmission over the first frequency band.

6. The method of claim 1, wherein transmitting the data over the first frequency band by the first mobile station comprises concatenating the information received from the base station with cooperative information received from the one or more second mobile stations to generate a scalable frame for uplink transmission, wherein concatenating the information includes concatenating data packets.

7. The method of claim 1, wherein the at least one power value of signals is transmitted wirelessly.

8. The method of claim 1, wherein the at least one power value of signals is transmitted in a particular transmission.

9. A method for wireless communications by a base station in a cooperative multiple input multiple output (MIMO) system using multiband antennas, the method comprising:
    selecting at least a first frequency band for direct transmission with a first mobile station;
    selecting at least a second frequency band for transmissions between the first mobile station and one or more second mobile stations;
    transmitting information about the first frequency band and the second frequency band to the first mobile station;
    receiving, from the first mobile station, at least one power value of signals the first mobile station received in the second frequency band from the one or more second mobile stations in a vicinity of the first mobile station;
    assigning an allowable power value to the first mobile station for the second frequency band; and
    transmitting, to the first mobile station, the allowable power value for the second frequency band.

10. The method of claim 9, wherein the second frequency band employs a multiple access channel.

11. The method of claim 9, wherein the second frequency band employs a random access channel.

12. The method of claim 9, further comprising:
    employing a first power control scheme for the first frequency band and employing a second power control scheme for the second frequency band; and
    assigning a second allowable power value to the first mobile station for the first frequency band.

13. The method of claim 12, wherein the allowable power value is less than the second allowable power value.

14. The method of claim 9, wherein the allowable power value is calculated based on a threshold and the at least one power value of signals.

15. The method of claim 9, wherein the at least one power value of signals is received wirelessly.

16. The method of claim 9, wherein the at least one power value of signals is received in a particular transmission.

17. An apparatus for wireless communications in a cooperative multiple input multiple output (MIMO) system using multiband antennas, the apparatus comprising:
    a processor;
    a transceiver coupled to the processor, wherein the transceiver is configured to receive information from a base station, the information associated with a first frequency band and a second frequency band, wherein the first frequency band is for transmissions between a first mobile station and the base station, and wherein the second frequency band is for transmissions between the first mobile station and one or more second mobile stations; and
    a signal detector coupled to the processor, wherein the signal detector is configured to:
        monitor signals received over the second frequency band; and
        measure power of the signals;
    wherein the transceiver is further configured to:
        transmit, to the base station, at least one power value of the signals received over the second frequency band;
        receive an allowable power value for the second frequency band from the base station; and
        transmit data over the first frequency band and the second frequency band, wherein transmission power for transmission over the second frequency band is less than the allowable power value for the second frequency band.

18. The apparatus of claim 17, wherein the data is transmitted simultaneously over the first frequency band and the second frequency band using a multi-band antenna.

19. The apparatus of claim 17, wherein the signals received over the second frequency band are transmitted from the one or more second mobile stations in a vicinity of the first mobile station.

20. The apparatus of claim 17, wherein the second frequency band employs a multiple access channel or a random access channel.

21. The apparatus of claim 17, wherein the allowable power value for transmission over the second frequency band is less than a second allowable power value for transmission over the first frequency band.

22. The apparatus of claim 17, wherein transmitting the data over the first frequency band comprises concatenating the information received from the base station with cooperative information received from the one or more second mobile stations to generate a scalable frame for uplink transmission, wherein concatenating the information includes concatenating data packets.

23. The apparatus of claim 17, wherein the transceiver is further configured to receive the information wirelessly.

24. The apparatus of claim 17, wherein the at least one power value of signals is transmitted in a particular transmission.

25. An apparatus for wireless communications by a base station in a cooperative multiple input multiple output (MIMO) system using multiband antennas, the apparatus comprising:
    a processor configured to:
        select at least a first frequency band for direct transmission with a first mobile station; and select at least a second frequency band to be used for transmissions between the first mobile station and one or more second mobile stations; and a transceiver coupled to the processor, wherein the transceiver is configured to:

transmit information about the first frequency band and the second frequency band to the first mobile station;

receive, from the first mobile station, at least one power value of signals the first mobile station received in the second frequency band from the one or more second mobile stations in a vicinity of the first mobile station; and transmit an allowable power value for the second frequency band to the first mobile station.

26. The apparatus of claim 25, wherein the second frequency band employs a multiple access channel.

27. The apparatus of claim 25, wherein the second frequency band employs a random access channel.

28. The apparatus of claim 25, wherein the processor is further configured to:

employ a first power control scheme for the first frequency band;

employ a second power control scheme for the second frequency band; and assign a second allowable power value to the first mobile station for the first frequency band.

29. The apparatus of claim 28, wherein the allowable power value for transmission over the second frequency band is less than the second allowable power value for transmission over the first frequency band.

30. The apparatus of claim 25, wherein the processor is further configured to calculate the allowable power value based on a threshold and the at least one power value of signals.

31. The apparatus of claim 25, wherein the transceiver is further configured to receive the information wirelessly.

32. The apparatus of claim 25, wherein the at least one power value of signals is received in a particular transmission.

33. An apparatus for wireless communications in a cooperative multiple input multiple output (MIMO) system using multiband antennas, the apparatus comprising:

means for receiving information from a base station, the information associated with a first frequency band and a second frequency band, wherein the first frequency band is for transmissions between a first mobile station and the base station, and wherein the second frequency band is for transmissions between the first mobile station and one or more second mobile stations;

means for monitoring signals received over the second frequency band and measuring power of the signals;

means for transmitting, to the base station, at least one power value of the signals received over the second frequency band;

means for receiving, from the base station, an allowable power value for the second frequency band; and means for transmitting data over the first frequency band and the second frequency band, wherein transmission power for transmission over the second frequency band is less than the allowable power value for the second frequency band.

34. The apparatus of claim 33, wherein the data is transmitted simultaneously over the first frequency band and the second frequency band using a multi-band antenna.

35. The apparatus of claim 33, wherein the signals received over the second frequency band are transmitted from the one or more second mobile stations in a vicinity of the first mobile station.

36. The apparatus of claim 33, wherein the second frequency band employs a multiple access channel.

37. The apparatus of claim 33, wherein the second frequency band employs a random access channel.

38. The apparatus of claim 33, wherein the allowable power value for transmission over the second frequency band is less than a second allowable power value for transmission over the first frequency band.

39. The apparatus of claim 33, wherein the means for transmitting data over the first frequency band by the first mobile station comprises:

means for concatenating the information from the first mobile station with cooperative information received from the one or more second mobile stations to generate a scalable frame for uplink transmission;

wherein the means for concatenating comprises means for concatenating data packets.

40. An apparatus for wireless communications in a cooperative multiple input multiple output (MIMO) system using multiband antennas, the apparatus comprising:

means for selecting at least a first frequency band for direct transmission with a first mobile station;

means for selecting at least a second frequency band for transmissions between the first mobile station and one or more second mobile stations;

means for transmitting information about the first frequency band and the second frequency band to the first mobile station;

means for receiving, from the first mobile station, at least one power value of signals the first mobile station received in the second frequency band from the one or more second mobile stations in a vicinity of the first mobile station;

means for assigning an allowable power value to the first mobile station for the second frequency band; and means for transmitting the allowable power value for the second frequency band to the first mobile station.

41. The apparatus of claim 40, wherein the second frequency band employs a multiple access channel.

42. The apparatus of claim 40, wherein the second frequency band employs a random access channel.

43. The apparatus of claim 40, further comprising:

means for employing a first power control scheme for the first frequency band and employing a second power control scheme for the second frequency band; and means for assigning a second allowable power value to the first mobile station for the first frequency band.

44. The apparatus of claim 43, wherein the allowable power value is less than the second allowable power value.

45. The apparatus of claim 40, wherein the allowable power value is determined by means for calculating the allowable power value based at least on a threshold and the at least one power value of signals.

46. A computer-program product for wireless communications in a cooperative multiple input multiple output (MIMO) system using multiband antennas, the computer-program product comprising a non-transitory computer readable medium storing instructions executable by one or more processors, the instructions comprising:

instructions for receiving, at a first mobile station, information from a base station, the information associated with a first frequency band and a second frequency band, wherein the first frequency band is for transmissions between the base station and the first mobile station, and wherein the second frequency band is for transmissions between the first mobile station and one or more second mobile stations;

instructions for monitoring signals received over the second frequency band and measuring power of the signals;

instructions for transmitting, from the first mobile station to the base station, at least one power value of the signals received over the second frequency band;

instructions for receiving, at the first mobile station from the base station, an allowable power value for the second frequency band; and instructions for transmitting data over the first frequency band and the second frequency band, wherein transmission power for transmission over the second frequency band is less than the allowable power value for the second frequency band.

47. The computer-program product of claim 46, wherein the data is transmitted simultaneously over the first frequency band and the second frequency band using a multiband antenna.

48. The computer-program product of claim 46, wherein the signals received over the second frequency band are transmitted from the one or more second mobile stations in a vicinity of the first mobile station.

49. The computer-program product of claim 46, wherein the second frequency band employs a multiple access channel.

50. The computer-program product of claim 46, wherein the second frequency band employs a random access channel.

51. The computer-program product of claim 46, wherein the allowable power value for transmission over the second frequency band is less than a second allowable power value for transmission over the first frequency band.

52. The computer-program product of claim 46, wherein the instructions for transmitting data over the first frequency band by the first mobile station comprise instructions for concatenating the information received from the first mobile station with cooperative information received from the one or more second mobile stations to generate a scalable frame for uplink transmission, wherein the instructions for concatenating the information comprise instructions for concatenating data packets.

53. A computer-program product for wireless communications by a base station in a cooperative multiple input multiple output (MIMO) system using multiband antennas, the computer-program product comprising a non-transitory computer readable medium storing instructions executable by one or more processors, the instructions comprising:

instructions for selecting at least a first frequency band for direct transmission with a first mobile station and selecting at least a second frequency band for transmissions between the first mobile station and one or more second mobile stations;

instructions for transmitting information about the first frequency band and the second frequency band to the first mobile station;

instructions for receiving from the first mobile station, at least one power value of signals the first mobile station received in the second frequency band from the one or more second mobile stations in a vicinity of the first mobile station;

instructions for assigning an allowable power value to the first mobile station for the second frequency band; and instructions for transmitting the allowable power value for the second frequency band to the first mobile station.

54. The computer-program product of claim 53, wherein the second frequency band employs a multiple access channel.

55. The computer-program product of claim 53, wherein the second frequency band employs a random access channel.

56. The computer-program product of claim 53, further comprising:

instructions for employing a first power control scheme for the first frequency band and employing a second power control scheme for the second frequency band; and instructions for assigning a second allowable power value to the first mobile station for the first frequency band.

57. The computer-program product of claim 56, wherein the allowable power value for transmission over the second frequency band is less than the second allowable power value for transmission over the first frequency band.

58. The computer-program product of claim 53, wherein the allowable power value is calculated based at least on a threshold and the at least one power value of signals.

* * * * *